Oct. 10, 1967
V. N. BARZEE ET AL
3,345,751
DRAFTING TABLE APPARATUS
Filed Nov. 15, 1965
6 Sheets-Sheet 6
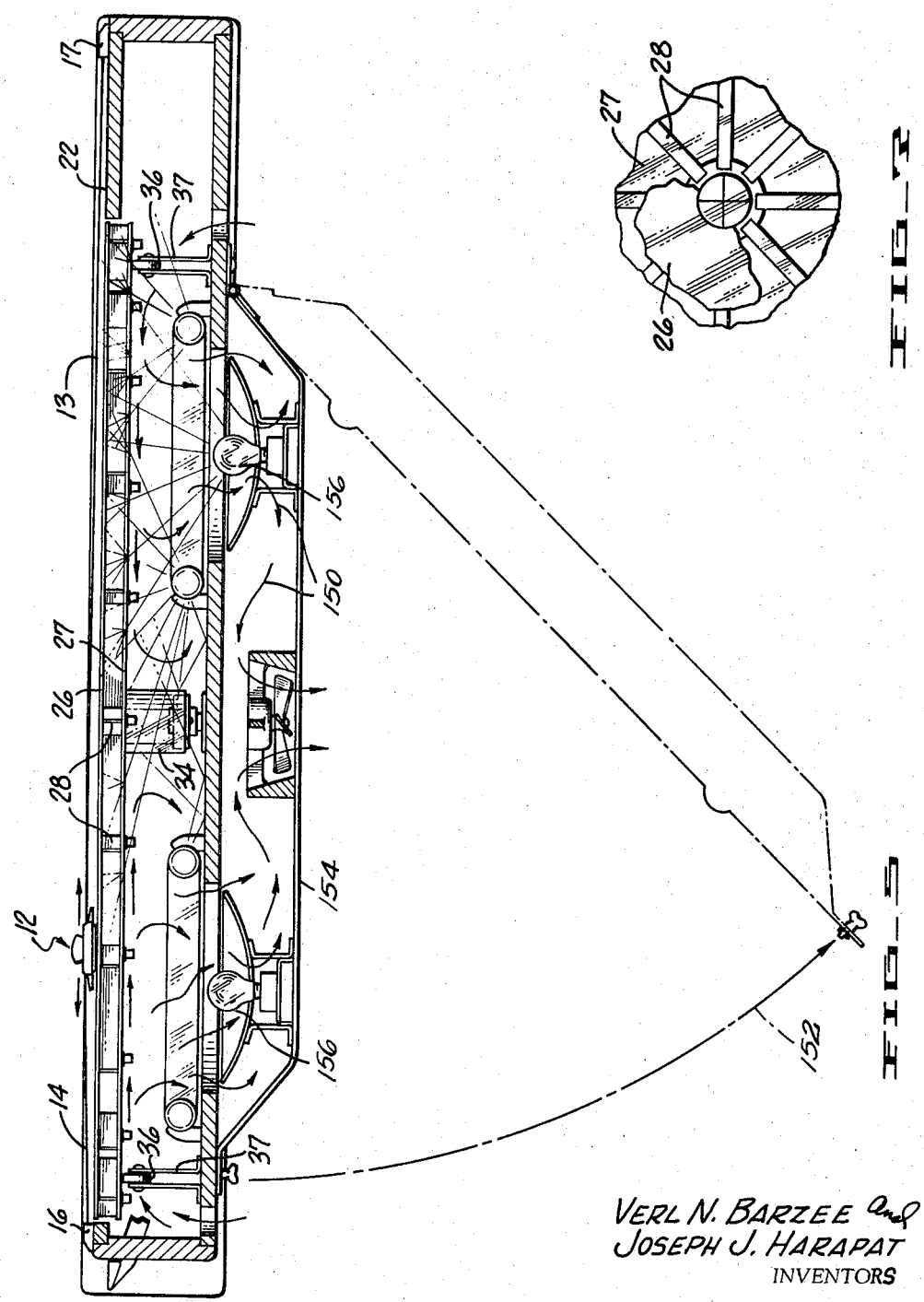
VERL N. BARZEE and
JOSEPH J. HARAPAT
INVENTORS
BY *Warren, Brosler*
*Cypher and Anglin*
ATTORNEYS

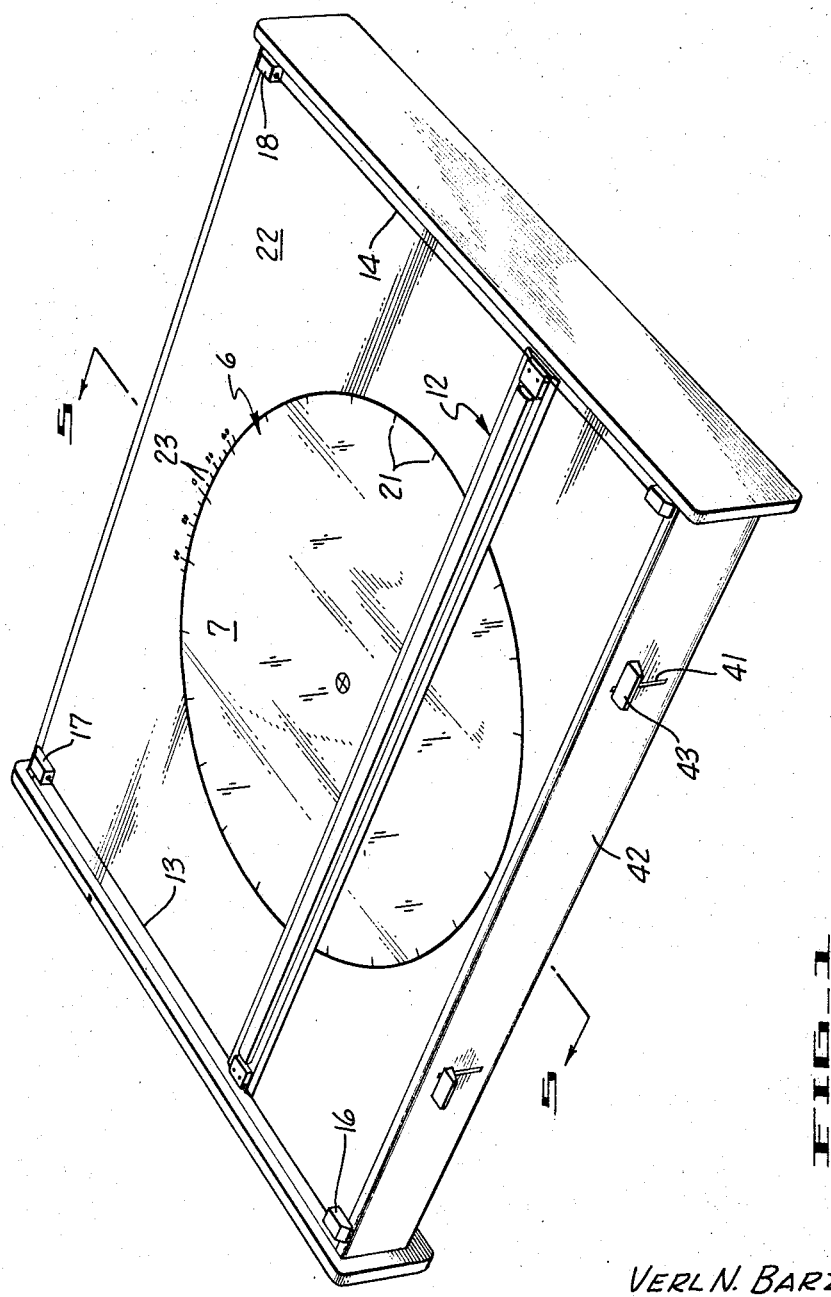

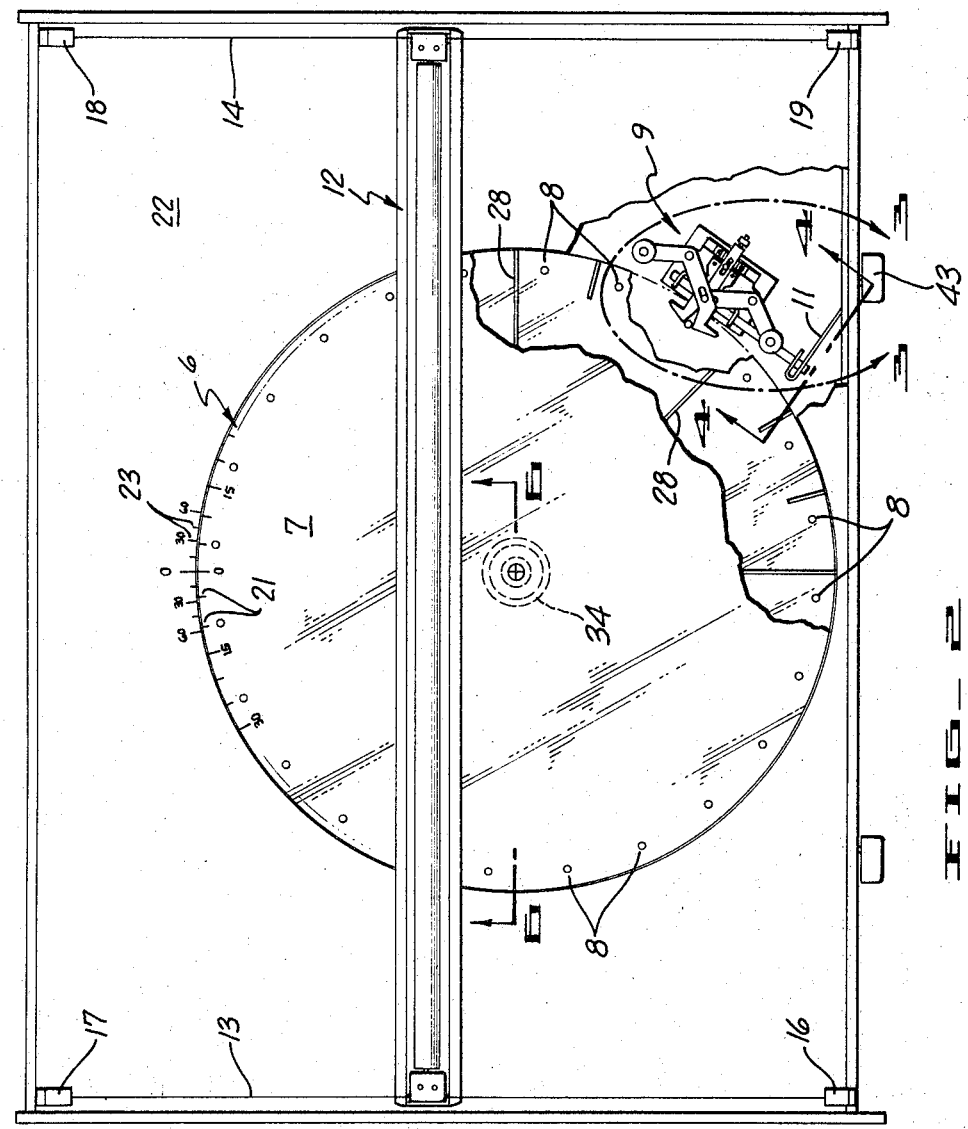

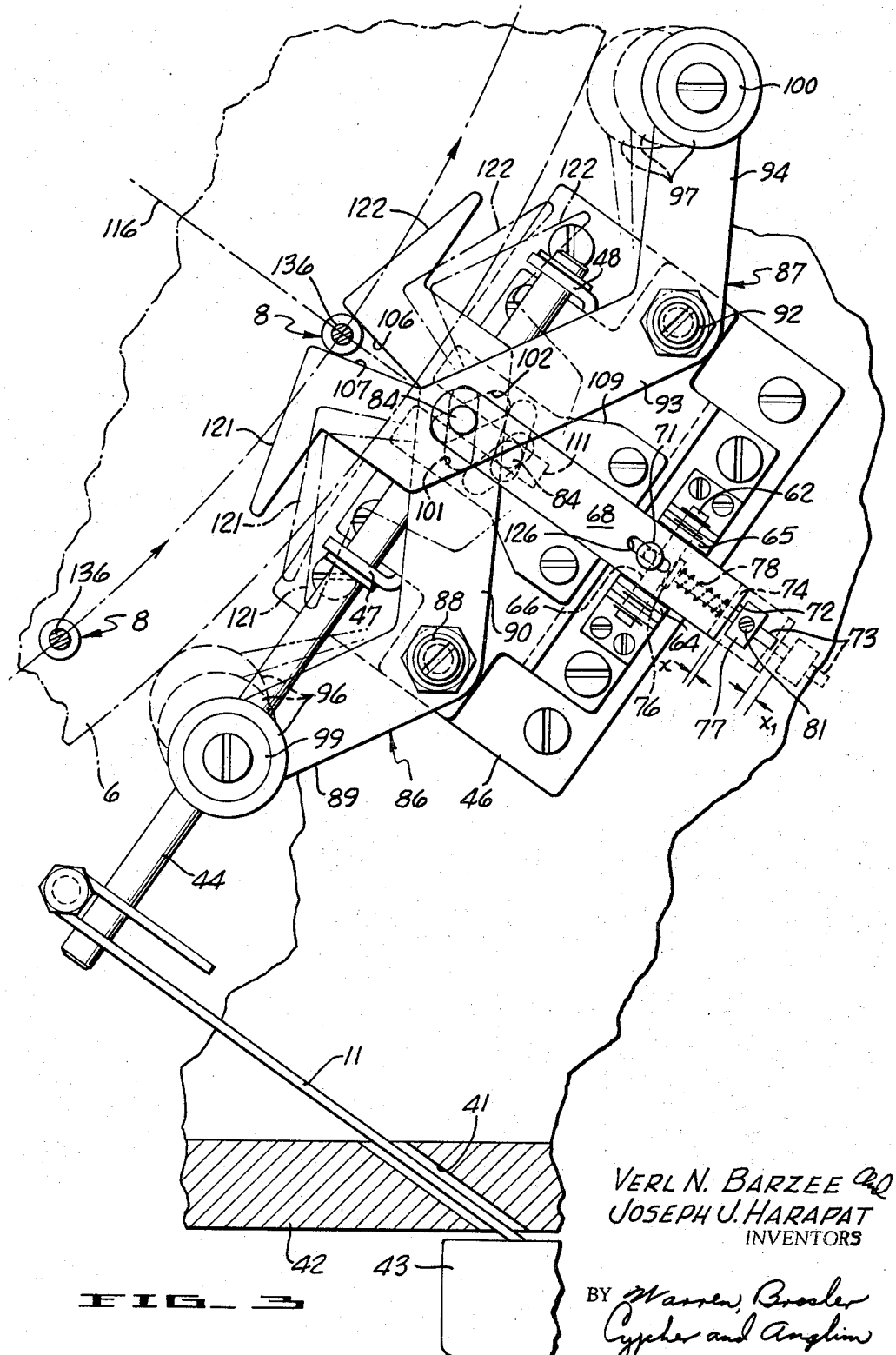

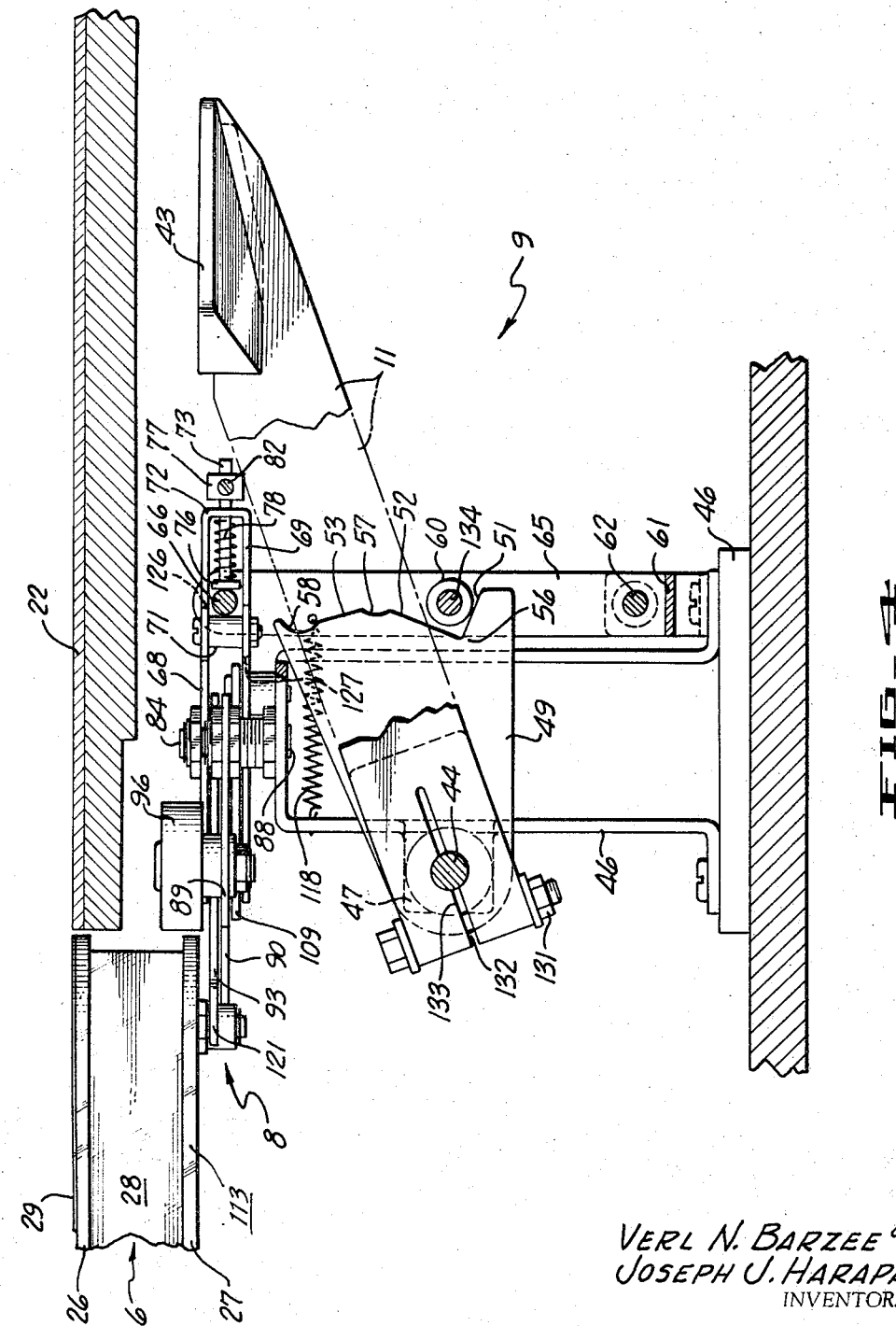

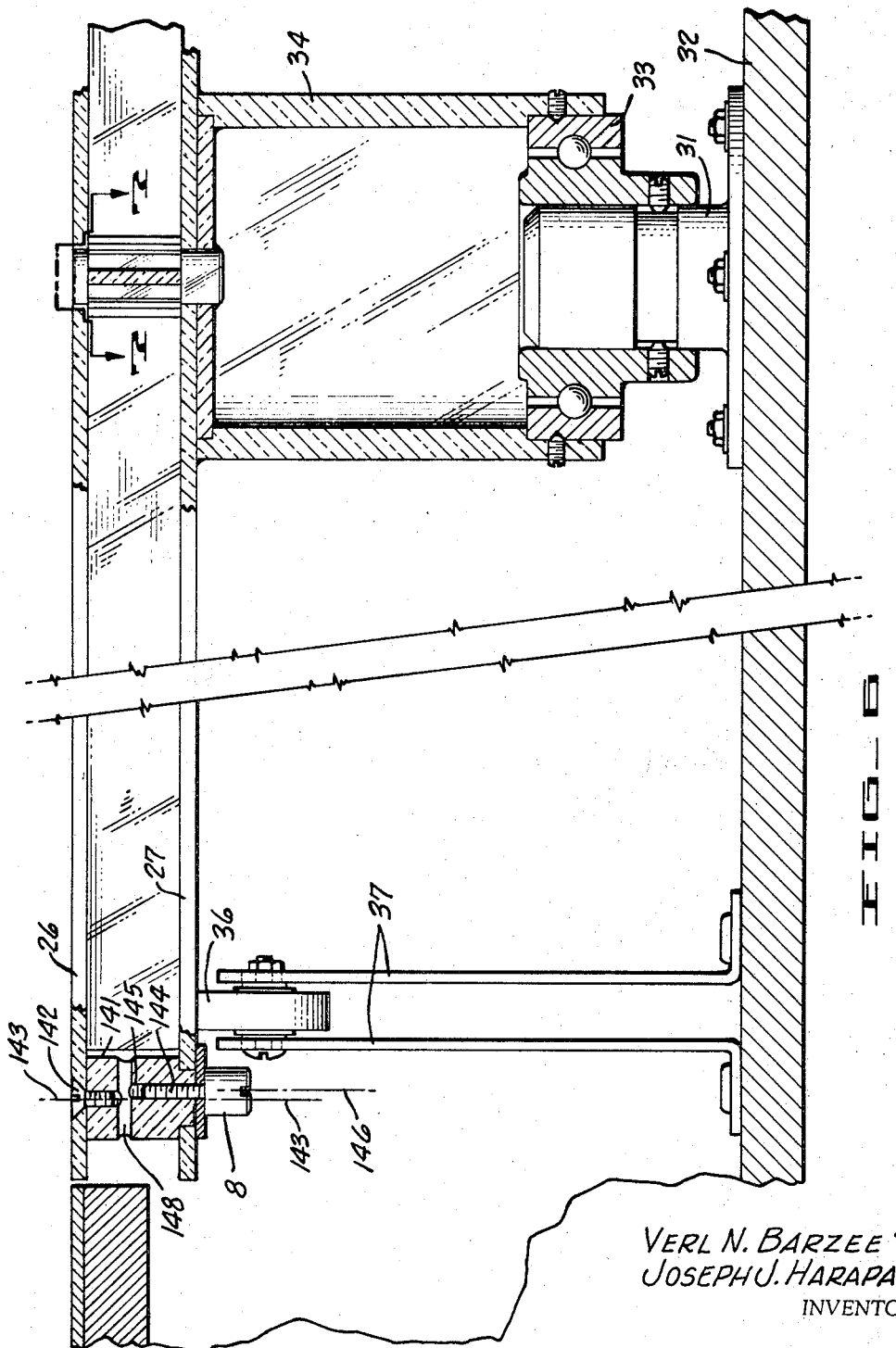

United States Patent Office 3,345,751
Patented Oct. 10, 1967

3,345,751
DRAFTING TABLE APPARATUS
Verl N. Barzee, 708 Knickerbocker Drive 94087, and Joseph J. Harapat, 1105 W. Iowa Ave. 94086, both of Sunnyvale, Calif.
Filed Nov. 15, 1965, Ser. No. 507,939
10 Claims. (Cl. 33—78)

ABSTRACT OF THE DISCLOSURE

A drafting table having a rotatable drafting surface in which a single lever permits free rotation in a first position, braking at any angular position in a second position and locking at any of several pre-selected indexing stations in a third position.

---

The present invention relates to drafting tables and more specifically to tables having a rotatable drafting surface.

An object of the present invention is to provide a new and improved drafting table apparatus.

Another object is to provide a brake and indexing control for the rotatable table operable by a single control means.

Still another object is to provide a faster and more economical and more accurate way of drafting without the use of triangles and standard protractors.

A further object is to provide a drafting table apparatus of the character described having a few relatively rugged parts providing long trouble-free service.

A still futher object is to provide a self-adjusting brake means.

Still another object is to provide accuracy in indexing over a long period of time with a minimum of adjustment.

A further object is to provide positive braking and indexing with automatic release means when the rotatable table is forced.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

With reference to said drawings (six sheets):

FIGURE 1 is a perspective view of the device as constructed in accordance with the present invention.

FIGURE 2 is a plan view of the device with a portion broken away for purposes of clarity.

FIGURE 3 is an enlarged plan view of a portion of the device taken substantially within the line 3—3 of FIGURE 2.

FIGURE 4 is an enlarged view of a portion of the device taken substantially along the line 4—4 of FIGURE 2.

FIGURE 5 is an enlarged cross-sectional view of the device shown in FIGURE 1 with a portion in phantom line.

FIGURE 6 is an enlarged cross-sectional view of a portion of the device taken substantially along the line 6—6 of FIGURE 2.

FIGURE 7 is an enlarged view of a portion of the device taken substantially along the line 7—7 of FIGURE 6 with portions removed for purposes of clarity.

The drafting table apparatus of the present invention consists briefly of a member 6 mounted for rotation having a planar drafting surface 7, and a plurality of pre-selected angularly related indexing stations 8; and manually operable control means 9 having a control lever 11 operatively connected to the member and permitting rotation of the member at a first position, engaging and locking the member at infinitely variable angular positions at a second position, and selectively engaging one of the indexing stations at a third position.

The device possesses all the functions of present day universal drafting machines and includes a precision high quality straight edge 12 mounted between cables 13 and 14 anchored by means 16, 17, 18 and 19.

Member 7 is here shown as a circular 360 degree protractor of sufficient diameter (about 28 inches) that the working medium may be placed inside the protractor and rotated to any desired angle. The protractor carries indicia markings 21 at its periphery at pre-selected intervals of one degree or fractions or multiples thereof. The rotatable member is here shown inset in a larger rectangular board with its surface flush with the working surface 22 of the surrounding board. For even greater accuracy in measuring angles, surface 22 may be provided with vernier markings 23.

The rotatable member 6 may be constructed in various ways to form a rigid working surface and here consists briefly of a pair of circular Plexiglas discs 26 and 27 joined by a plurality of radial rib members 28; the top disc being covered by a thin layer of vinyl sheet 29 to provide a high-quality working surface.

The rotatable table may be mounted in various ways, one of which is shown in FIGURE 6, and is briefly described as follows: a stub shaft 31 is mounted on base 32 for receipt of a bearing brace 33 upon which is mounted a collar 34 which is connected directly to the top and bottom Plexiglas members of the rotatable table. Lateral stability is achieved by providing rollers 36 in rolling engagement with the periphery of the rotatable table and are mounted on standards 37 attached to the base of the table.

The indexing and braking control means is illustrated in FIGURES 2, 3 and 4 and the best mode of construction is described as follows: Control level 11 is inserted through a slot 41 in a front panel 42 and provided with a manually engageable handle 43. The other end of control level 11 is fixedly mounted on a shaft 44 mounted for rotation on support 46 in bearings 47 and 48. A cam member 49 is mounted on shaft 44 for rotation therewith and is formed with cam faces 51, 52, and 53 and detent portions 56, 57 and 58. A cam follower 60 is positioned for engagement with and movement over the cam faces and into the detent and is mounted on a crank arm 61 which is pivotally mounted at pivot point 62 on support 46. The crank arm is formed with a pair of upright members 64 and 65 joined by cam follower 60 and a pin 66. Pin 66 drives a U-shaped thrust member having disposed leg members 68 and 69 joined by a pin 71 forming a first stop member and an end 72 forming a second stop member. Pin 66 is held against pin 71 by a reciprocating shaft 73 mounted through an opening 74 in the thrust member and having an abutting member and spring seat 76 for engagement with pin 66 and adjustable collar 77 for engagement with end 72 of the thrust member. A spring 78 mounted on shaft 73 in engagement with end 72 biases head 76 against pin 66. Collar 77 is slidably mounted on shaft 73 by set screws 81 and 82 so as to leave a space between the head and end 72 designated by the letter "x."

The thrust member is formed with an opening for receiving a pin 84 therethrough for driving a pair of pivotally mounted arms generally designated by members by numbers 86 and 87. Arm 86 is pivotally mounted on support 46 at pivot point 88 and is formed with angularly related members 89 and 90. Similarly arm 87 is pivotally mounted on support 46 at pivot point 92 and is formed with a pair of angularly related members 93 and 94. Members 89 and 94 carrying second means such as brake shoes at their ends here shown as a cylindrically shaped rubber members 96 and 97 mounted on hubs 99 and 100. It is important that the rubber brake shoe be resilient so as to deform upon contact with the Plexiglas disc 27 and yet be firm enough to avoid angular movement of the rotatable table when the brakes are set. We have found that a rubber having a Shore A durometer of 50 to 55 is satisfactory.

First means such as indexing members 90 and 93 are formed with elongated slots 101 and 102 positioned in overlapping relation and dimensioned for receipt of pin 84. The ends of members 90 and 93 are positioned in overlapping scissors-like manner with the floating pivot being at pin 84. Member 90 is formed with a cam face 106 for engaging indexing studs 8 and member 93 is formed with a cam face 107 for engaging the other side of the indexing stud.

Essential to the operation of indexing and braking is a guide member 109 having a slot 111 dimensioned for receiving pin 84. The guide member 109 insures simultaneous contact of brake shoes 96 and 97 with an annular face mounted on the rotary member which is here shown as the peripheral edge 113 of Plexiglas disc 27. Guide member 109 also positions members 90 and 93 so that each indexing station will be contacted precisely at a preselected angular position aligning the center lines of indexing station 8 and pin 84 along radial line 116.

The brake shoes and the indexing arms are held in the braked and indexed position by means of a spring 118 connected to support 46 and crank arm 65. The use of spring 118 together with cam face 121 formed on arm member 93 and cam 122 formed on arm member 90 makes it possible for the rotary member 6 to be forcibly rotated into the indexed position from either direction. The rotary member 6 may also be force rotated out of an indexed position.

As shown in FIGURES 3 and 4 the control means is in the third or indexed position. In order to move from the indexed position to the first position in which the rotable table can move freely lever 11 is moved downwardly so as to rotate shaft 4 and move cam 49 in a clockwise direction as shown in FIGURE 4 so that cam follower 60 moves to detent position 57. Spring 118 will hold cam follower 60 in the detented position. Clockwise rotation of the cam 49 causes the chank member to pivot in a clockwise direction about its pivot point 62 and pin 66 moves against head 76. Spring 78 is selected so as to hold pin 66 in contact with pin 71 in the first position of the lever. The thrust member is therefore moved to the right as shown in FIGURE 4 so that pin 84 engages slots 101 and 102 of arms 90 and 93 thereby causing arm 90 to rotate in a clockwise direction as shown in FIGURE 3 and arm 93 to rotate in a counter-clockwise direction about pivot point 92. This movement causes cam faces 106 and 107 to spread apart and release indexing station 8 and move back and out of engagement with the indexing studs.

In moving the lever from the first or free wheeling position to the second or brake position the operation of the mechanism is as follows: Lever 11 is moved downwardly as shown in FIGURE 4 rotating shaft 44 and moving cam 49 in a clockwise direction. Cam follower 60 moves from detent 57 along cam face 53 to detent 58. The crank arm moves in a clockwise direction around pivot point 62 against the biasing action of spring 118. Pin 66 moves against head 76, forcing the thrust member to the right as shown in FIGURE 4. Pin 84 causes arm 90 to pivot about its pivot 88 in a clockwise direction as shown in FIGURE 3 and causes arm 93 to pivot in a counterclockwise direction around its pivot 92 thus causing the brake shoes 96 and 97 to move into engagement with annular face 113 of the rotatable member 6. The parts are so arranged that the brake shoes come in contact with the annular face at a point intermediate the detents 57 and 58 on cam 49. The spring force of spring 78 is such that the spring is compressed as the crank arm is moved clockwise by cam 49. Thus, the force applied by the brake shoes to the rotable member is not directly proportional to the distance the lever 11 is moved. Thus may be graphically illustrated by referring to FIGURE 3 in which it may be seen that head 77 is displaced from the end of the thrust member 72 by a distance $x1$ when the lever 11 is in the second position. The distance $x1$ is greater than the distance $x$.

Movement of the lever from the second position to any of the other positions merely reverses the movement of the parts as described above.

Legs 68 and 69 of the thrust member are provided with a slot 126 and 127 to enable pin 71 to be adjusted along the longitudinal axis of the thrust member so that pin 66 is held in engagement with head 76 in the first and third positions of the lever.

The angular position at which the lever 11 is mounted on the shaft 44 may be adjusted by loosening the nut 131 on threaded shaft 132 thereby loosening the frictional grip of the split and lever formed by slot 133.

To enable smoother operation of the device, cam follower 60 is mounted for rotation on shaft 134. In addition, depending stubs 8 may also be mounted for free rotation on stub shafts 136.

One of the important features of the present invention is the ability of the device to "home in" to a particular pre-selected indexing position. Thus, if the stud 8 is a few degrees from the pre-selected position, movement of lever 11 so as to move the arms from the free wheeling to the indexed position causes arm 89 to pivot in a counter-clockwise direction about pivot point 88 and arm 93 to pivot in a clockwise direction about pivot point 92 thereby initially having a wide gap between cam faces 106 and 107 and gradually narrowing as the arms reach the fully indexed position. Thus if stud 8 is slightly off the axis 116 it will be moved toward the axis as the cams 106 and 107 approach the final indexed position. This automatic homing feature alone saves a great deal of tedious work in bringing the table to a precise indexed position.

Essential to the construction of the present invention is the precise location of the indexing studs 8. This may be accomplished by providing a spacer member 141 between sheets 26 and 27. Sheet 26 is formed with an opening and a screw 142 inserted therethrough on an axis 143. Stud 8 is attached to threaded member 144 which is inserted in a bore 145 drilled in the spacer 141 at a position along axis 146 which is eccentric to axis 143. Thus in order to construct the device with the center line of stud 8 precisely at the pre-selected indexed position, spacer 141 is rotated and the eccentric mounting of stud 8 permits angular movement of the stud along the periphery of the circular table. When stud 8 is at the precise indexed position, a bonding agent is inserted between the spacer 141 and sheet 27 thus preventing further rotation of the spacer about axis 143. Drill hole 148 is provided in the spacer to permit insertion of a probe for rotating spacer 141 before bonding.

FIGURE 5 shows the ventilation system of the drafting table and the mounting system for the lights. Curved arrows 150 indicate the approximate path of air currents through the table. Arrow 152 indicates the path of hinged base 154 carrying lamps 156 from the closed to the open position.

We claim:
1. A drafting table apparatus comprising:
   a member mounted for rotation upon a support having a planar drafting surface, and a plurality of preselected angularly related indexing stations; and
   first means for selectively engaging one of said indexing stations;
   second means for engaging and locking said member at infinitely variable angular positions; and
   manually operable control means on said support having three operative positions, the first of which for permitting free rotation of the member, the second of which for operating said second means, and the third position for actuating said first means.

2. A drafting table apparatus as characterized in claim 1 comprising:
a straight edge mounted for parallel reciprocating movement over said planar drafting surface;
said member having an annular face; and
said second means having a brake shoe selectively engaging said annular face locking said rotatable member at infinitely variable angular positions, and said first means having an indexing member selectively engaging said indexing stations.

3. A drafting table apparatus as characterized in claim 1 wherein said indexing stations include:
depending studs; and
said first means includes a member for engaging one of said studs and rotating said table member to a pre-selected angular position.

4. A drafting table apparatus as characterized in claim 3 wherein said control means comprises:
a control lever;
a pair of pivotally mounted arms operatively connected to said control lever; and
each of said arms mounting said brake shoe at one end with the other ends cooperating to engage and hold said indexing station studs at a pre-selected angular position.

5. A drafting table apparatus as characterized in claim 4 wherein said control means comprises:
a cam member operatively connected to said lever and having detents formed therein corresponding to said first, second and third positions of said lever;
a cam follower;
a crank arm mounting said cam follower and pivotally connected to said support;
first spring means selectively biasing said crank arm into said detent positions; and
a thrust member operatively connecting said crank arm and said pair of pivotally mounted arms.

6. A drafting table apparatus as characterized in claim 5 wherein:
said thrust member is formed with a first stop for engaging an end of said crank arm in said third position of said control means, and a second stop spaced from first stop; and
second spring means connected to said second stop and biasing said crank arm toward said first stop and permitting movement of said lever between said first and second positions without a proportional increase in force of said brake shoes against said annular face.

7. A drafting table apparatus as characterized in claim 5 wherein:
said other ends of said arms are formed with cam faces engaging said depending studs so as to permit forced rotation of said member to a pre-selected angular position.

8. A drafting table apparatus as characterized in claim 5 wherein:
the pivot points of said arms are positioned radially of said studs so as to permit forced rotation of said member from a pre-selected angular position.

9. A drafting table apparatus as characterized in claim 1 comprising:
said member having an annular face; and
said second means having a resilient brake shoe selectively and frictionally engaging said annular face locking said rotatable member at infinitely variable angular positions, and said first means having an indexing member selectively engaging said indexing stations.

10. A drafting table apparatus as described in claim 1 wherein:
said indexing stations include a spacer member mounted for rotation about a first axis and a stud mounted on said spacer on a second axis eccentric to said first axis.

References Cited

UNITED STATES PATENTS

| | | | |
|---|---|---|---|
| Re. 24,927 | 1/1961 | Shelly | 33—78 X |
| 2,967,439 | 1/1961 | Cole | 33—174 |
| 3,040,434 | 6/1962 | Yarosz | 33—174 |

LEONARD FORMAN, *Primary Examiner.*

HARRY N. HAROIAN, *Examiner.*